United States Patent
Jung et al.

(10) Patent No.: US 7,295,715 B2
(45) Date of Patent: Nov. 13, 2007

(54) APPARATUS AND METHOD FOR DETECTING FREQUENCY

(75) Inventors: Byoung-hwa Jung, Seoul (KR); Hyung-jin Choi, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 945 days.

(21) Appl. No.: 10/617,798

(22) Filed: Jul. 14, 2003

(65) Prior Publication Data

US 2004/0028285 A1 Feb. 12, 2004

(30) Foreign Application Priority Data

Aug. 10, 2002 (KR) .................. 10-2002-0047357

(51) Int. Cl.
*G06K 9/40* (2006.01)
(52) U.S. Cl. .................................... 382/254
(58) Field of Classification Search ........ 382/254–269, 382/274–275, 298–299; 358/1.9, 1.2, 3.26, 358/528, 451, 445, 463; 345/472–472.2, 345/698, 631, 800; 348/581, 441–459, 606–631, 348/731, 735, 390.1; 375/240.29; 324/76.19
See application file for complete search history.

(56) References Cited

U.S. PATENT DOCUMENTS 4,994,740 A * 2/1991 Skudera, Jr. et al. .... 324/76.19
5,331,414 A * 7/1994 Golin ....................... 348/390.1
5,602,599 A * 2/1997 Greggain .................... 348/581
6,489,998 B1 * 12/2002 Thompson et al. ......... 348/452
7,027,099 B2 * 4/2006 Thompson et al. ......... 348/448
2006/0262217 A1 * 11/2006 Thompson et al. ......... 348/441

FOREIGN PATENT DOCUMENTS

JP      07-143361      *  6/1995
JP       7-143361 A        6/1995
KR     95-005062 B1        5/1995

* cited by examiner

Primary Examiner—Ishrat Sherali
(74) Attorney, Agent, or Firm—Sughrue Mion, PLLC

(57) ABSTRACT

Provided are an apparatus and method for precisely processing an input signal by detecting the frequency characteristic of the signal and applying the detection result in an image signal processing block to reduce noise in the signal or enhance the details of the signal. The apparatus includes an indication value calculator, a level selector, and a frequency characteristic determination unit. Accordingly, the frequency distribution of an input signal is analyzed, and the signal is filtered by adjusting its filtering frequency band based on the analyzed frequency characteristic. Thus, it is possible to appropriately filter a signal using only a filter regardless of the resolution of the signal. In particular, noise in the signals of different scale ratios can be reduced or the details of the signal can be enhanced by processing the signals by only a filter.

36 Claims, 11 Drawing Sheets

FIG. 1 (PRIOR ART)
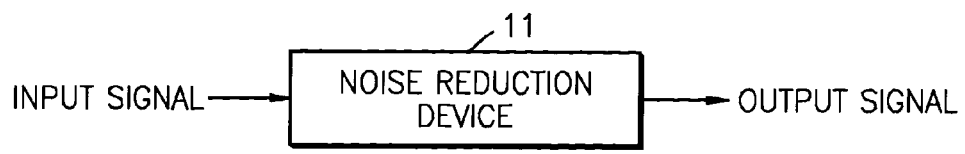
FIG. 2 (PRIOR ART)
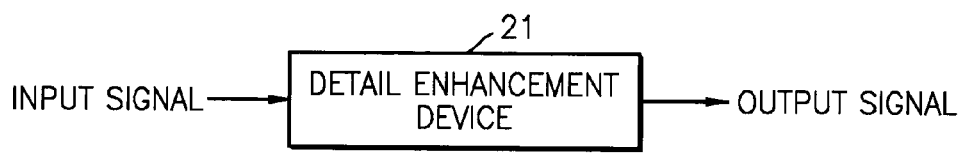
FIG. 3
| TYPE OF INPUT IMAGE (WITH RESPECT TO PIXEL FREQ.) | MAX FREQUENCY | SAMPLING FREQ. (NYQUIST FREQ.) |
|---|---|---|
| ORIGINAL SD | 4.3 Mhz | 13.5 Mhz (6.75 Mhz) |
| DOWN SCALED SD (FROM HD) | IT DEPENDS ON SCALE RATIO OF IMAGE | |
| ORIGINAL HD | 30 Mhz | 74.25 Mhz (37.125 Mhz) |
| UP SCALED HD (FROM SD) | IT DEPENDS ON SCALE RATIO OF IMAGE | |

FIG. 9

| UP-SCALED INPUT IMAGE | NORMALIZED MAXIMUM FREQUENCY | IF AN INPUT IMAGE HAS A RANGE BETWEEN 0 AND 255 INDICATION VALUE=> ABS(−128~127)=(0~128) |
|---|---|---|
| 720 × 480 => 1280 × 720 | (4.3/6.75) × (720/1280)=0.36 | 37 under |
| 720 × 480 => 1920 × 720 | (4.3/6.75) × (720/1920)=0.24 | 18 under |
| 1280 × 720 => 1920 × 1080 | (30/37.125) × (1280/1920)=0.54 | 71 under |

APPARATUS AND METHOD FOR DETECTING FREQUENCY

This application claims the priority of Korean Patent Application No. 2002-47357 filed Aug. 10, 2002, in the Korean Intellectual Property Office, the disclosure of which is incorporated herein in its entirety by reference.

BACKGROUND OF THE INVENTION

1. Field of the Invention

The present invention relates to a method of detecting a frequency characteristic, and more particularly, to a method of more precisely processing an image signal by analyzing the frequency distribution of the signal and using the analysis result in a signal processing block to reduce noise in the signal or improve details of the signal.

2. Description of the Related Art

FIG. 1 illustrates a conventional noise reduction device set on a filtering frequency band. If the device is a high-pass filter, only highfrequency components of a signal are allowed to pass through the filter and other components are filtered. If the device is a band-pass filter, only frequencies within a particular frequency band are allowed to pass through the filter. If the device is a low-pass filter, only low-frequency components are allowed to pass through the filter.

FIG. 2 illustrates a conventional detail enhancement device. The conventional detail enhancement device is also set on a filtering frequency band. As above, the device may be a high-pass filter, a band-pass filter, or a low-pass filter. The detail enhancement device makes components which cannot be perceived by the human eyes look sharper by amplifying a filtered signal and lapping the filtered signal over the original signal.

FIG. 3 is a table illustrating the maximum frequency, sampling frequency, and Nyquist frequency of a pixel of different types of input images. Referring to FIG. 3, the maximum frequency is 4.3 Mhz when an input image is a standard definition (SD) image, i.e., the resolution is 720×480 which is the same as that of an image generated using the National Television System Committee (NTSC) standard or the phase alternation line (PAL) standard. Sampling is the process of making a discontinuous pulse train by cutting a continuous wave signal by predetermined intervals of time. Here, the predetermined interval of time is called sampling frequency. As is well known, the sampling frequency is two times greater than the maximum frequency component of a signal. This is because frequency folding occurring at a frequency component greater than the sampling frequency/2 causes aliasing. The sampling frequency/2 is called the Nyquist frequency. Referring to FIG. 3, the sampling frequency of the input SD image is 13.5 Mhz and the Nyquist frequency is 6.75 Mhz.

When the input image is a high-definition (HD) image, i.e., the resolution of the input image is 1920×1080, the maximum frequency is 30 Mhz. In this case, the sampling frequency is 74.25 Mhz and the Nyquist frequency is 37.125 Mhz.

If an SD image of 720×480, which has the maximum frequency of 4.3 Mhz, is up scaled to an HD image of 1920×1080, the maximum frequency of the pixels of the up-scaled HD image in the horizontal direction is 8.87 Mhz, i.e., (4.3/6.75)×(720/1920)×37.125=8.87 Mhz.

That is, if an image is up scaled or down scaled, the maximum frequency of the pixels of the scaled image is determined by resolution and frequency ratios.

FIG. 4 illustrates waveform diagrams of signals passing through a conventional high-pass filter. When an input image signal having a waveform 41 passes through a high-pass filter with a filtering frequency band 42, a signal having a waveform 43 is output from the filter. However, when an up-scaled image signal having a waveform 44 is filtered by the high-pass filter having the filtering frequency band 42, since a cutoff frequency is much higher than the scale ratio of the up-scaled image, data output from the filter is not reliable. For instance, if the scaled signal having the waveform 44 is a signal that is scaled to the double of the original signal, no image signal is output from the high-pass filter with the filtering frequency band 42, the cutoff frequency of which is π/2, when the scaled signal passes through the high-pass filter. Therefore, it is impossible to reduce noise in the signal or enhance the details of the signal.

There are various types of image signals including SD image signals and HD image signals. Also, as different types of image processors are developed, scaling is frequently required to adjust the resolution of an image signal to match an image processor. For instance, in order to reproduce an SD image in an HD-TV, the SD image needs to be up scaled so that its resolution is adjusted to be equivalent to that of the HD-TV. As described above, when the up-scaled image is processed using a high-pass filter whose cutoff frequency is much higher the scale ratio of the image as explained with reference to FIG. 4, the filtering operation is not successfully performed, and thus data output from the filter is not reliable. Further, the absence of reliable data results in a failure to reduce noise in an image signal or enhancing the details thereof using the conventional filter.

SUMMARY OF THE INVENTION

The present invention provides an apparatus and method for more reliably detecting the frequency characteristic of an input signal, the frequency characteristic being applied to an image signal processing block that reduces noise in the input signal and enhances the details thereof.

According to an aspect of the present invention, there is provided an apparatus for detecting a frequency characteristic of a signal, the apparatus comprising an indication value calculator which calculates an indication value which indicates a difference between a filtering frequency band of an image signal processor and a desired filtering frequency band of a signal; a level selector which selects the level of a section from sections labeled with different levels with respect to the indication value; and a frequency characteristic determination unit which determines the selected level as the frequency characteristic.

According to another aspect of the present invention, there is provided an apparatus for reducing noise in an input signal based on a frequency characteristic, comprising a frequency characteristic detector which detects the frequency characteristic of the input signal; and a noise reduction unit which reduces noise in the input signal based on the detected frequency characteristic.

According to yet another aspect of the present invention, there is provided an apparatus for enhancing the details of an input signal, the apparatus comprising a frequency characteristic detector which detects the frequency characteristic of the input signal; and a detail enhancement unit which enhances the details of the input signal based on the detected frequency characteristic.

According to still another aspect of the present invention, there is provided a method of detecting the frequency characteristic of an input signal, the method comprising calculating an indication value which indicates the difference between a predetermined basic filtering frequency band and a desired filtering frequency band of the input signal; selecting the level of a section from sections labeled with different levels with respect to the indication value; and determining the selected level as the frequency characteristic.

According to still another aspect of the present invention, there is provided a method of reducing noise in an input signal based on a frequency characteristic, the method comprising detecting the frequency characteristic of the input signal; and reducing noise in the input signal based on the detected frequency characteristic.

According to still another aspect of the present invention, there is provided a method of enhancing the details of an input signal, the method comprising detecting the frequency characteristic of the input signal; and enhancing the details of the input signal based on the detected frequency characteristic.

BRIEF DESCRIPTION OF THE DRAWINGS

The above and other aspects and advantages of the present invention will become more apparent by describing in detail exemplary embodiments thereof with reference to the attached drawings in which:

FIG. 1 illustrates a conventional noise reduction apparatus;

FIG. 2 illustrates a conventional detail enhancement apparatus;

FIG. 3 is a table illustrating the maximum frequency, sampling frequency, and Nyquist frequency of a pixel of different types of input images;

FIG. 9 is a table illustrating indication values obtained when inputting an up-scaled input image to the (−1 2 −1)/4 filter;

DETAILED DESCRIPTION OF THE INVENTION

Figure 4:
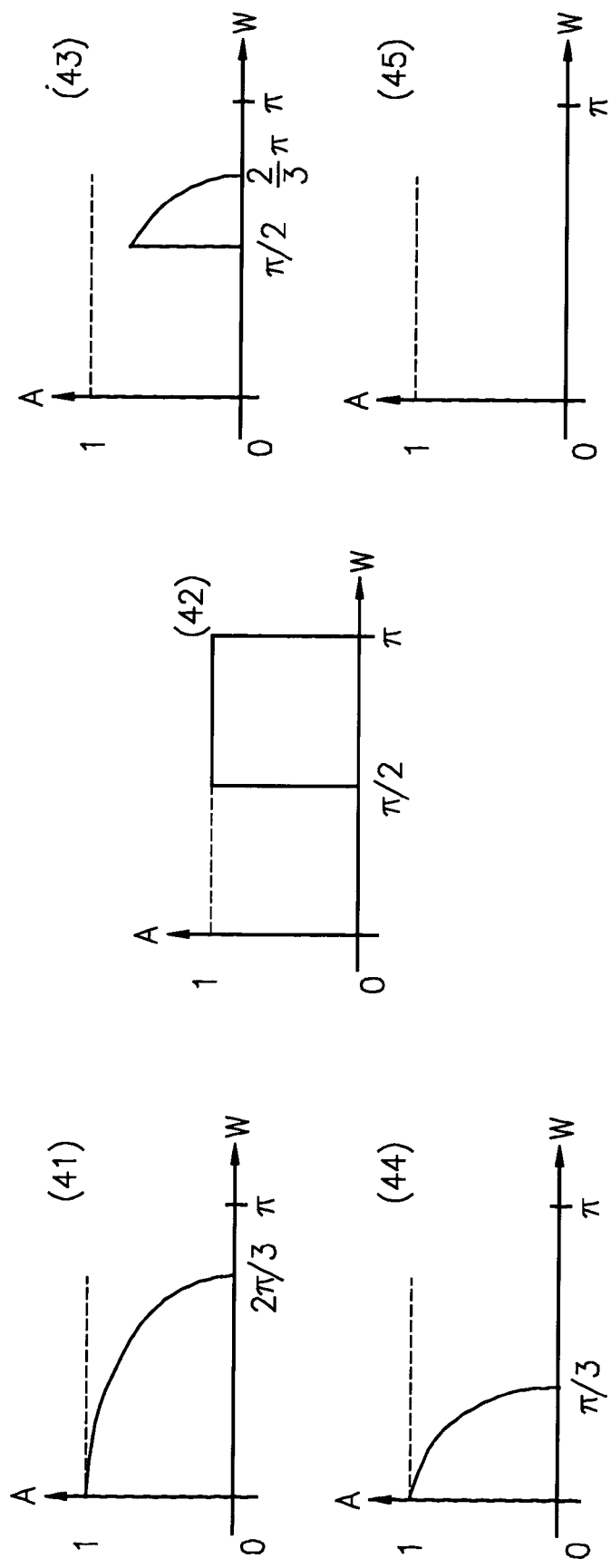
FIG. 4 illustrates waveform diagrams of image signals passing through a conventional high-pass filter.
Figure 5:
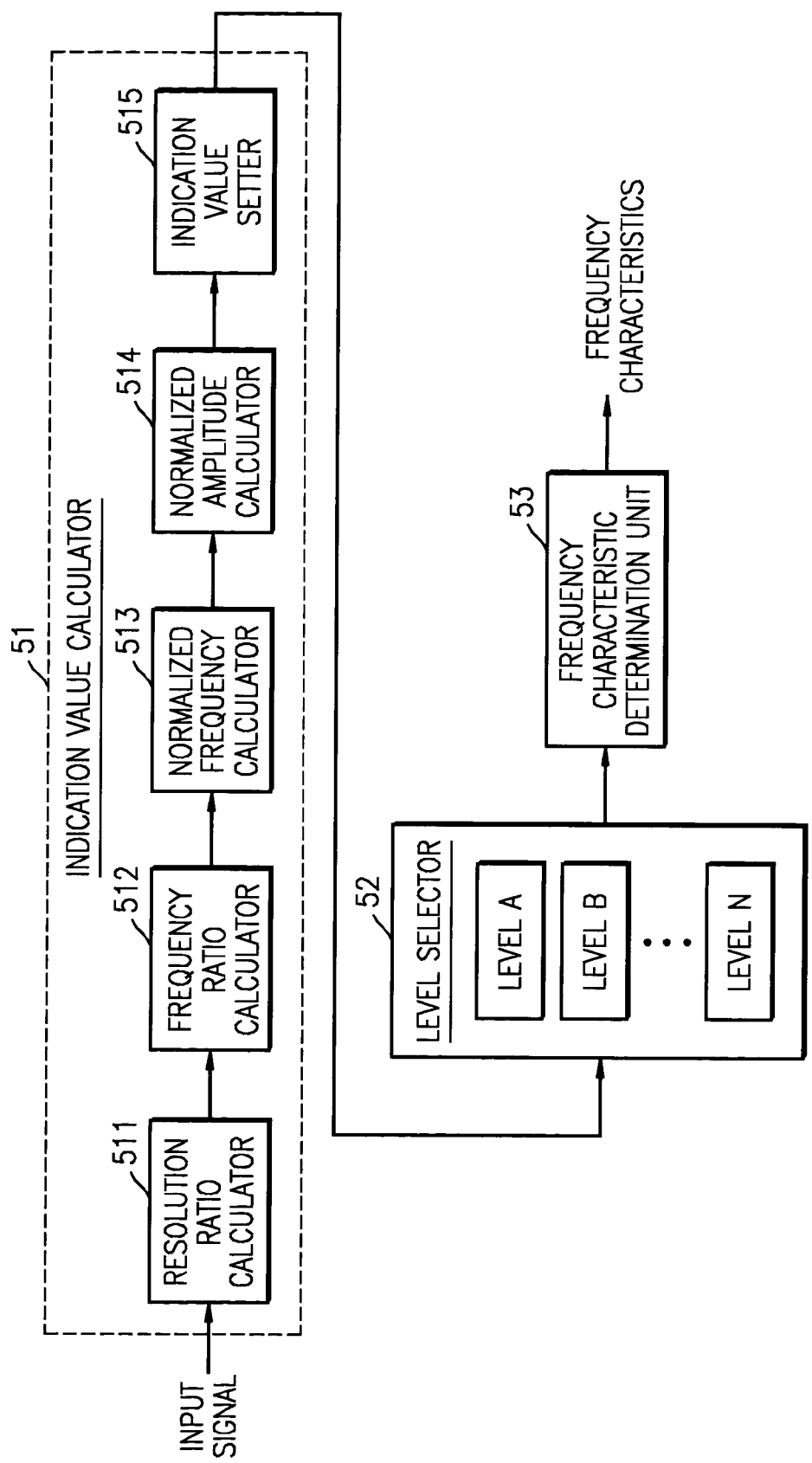
FIG. 5 is a block diagram of an apparatus for detecting the frequency characteristic of the input signal, according to an exemplary embodiment of the present invention.

FIG. 5 is a block diagram of an apparatus for detecting the frequency characteristic of an input signal, according to an exemplary embodiment of the present invention. The apparatus includes an indication value calculator 51, a level selector 52, and a frequency characteristic determination unit 53.

The indication value calculator 51 calculates an indication value that indicates the difference between a filtering frequency band of an image signal processor and a desired filtering frequency band of a signal. The level selector 52 selects the level of a section from sections labelled with different levels with respect to the indication value. The frequency characteristic determination unit 53 determines the selected level as the frequency characteristic of the signal. That is, the determined level is used in adjusting a filtering frequency band.

Provided that the signal is an image signal, the indication value calculator 51, the level selector 52, and the frequency characteristic determination unit 53 will now be explained in a greater detail.

The indication value calculator 51 includes a resolution ratio calculator 511, a frequency ratio calculator 512, a normalized frequency calculator 513, a normalized amplitude calculator 514, and an indication value setter 515. The resolution ratio calculator 511 calculates a resolution ratio of a standard resolution in the image signal processor to a resolution of an image signal. The image signal processor may be an apparatus for reducing noise in the input image signal or an apparatus for enhancing the details of the input image signal. In other words, the image signal processor may be used to detect the frequency characteristic of the input image signal either in the apparatus for reducing noise in the input image signal or the apparatus for enhancing the details thereof. The standard resolution is the resolution of an image signal filtered at a filtering frequency band which is basically provided by the image signal processor. For instance, if the image signal processor is capable of processing a standard definition (SD) image of 720×480, the resolution is 720×480. Also, the resolution of the input image signal is obtained by scaling the standard resolution to match a image signal output device. For instance, if the image signal output device is a high-definition (HD) TV which supports the resolution of 1920×1080, the SD image needs to be scaled to an HD image of 1920×1080. Therefore, the resolution of the input image signal is 1920×1080. The frequency ratio calculator 512 calculates a frequency ratio of the frequency of each pixel of the image signal to the Nyquist frequency. The normalized frequency calculator 513 calculates a normalized frequency by multiplying the resolution ratio by the frequency ratio. The normalized amplitude calculator 514 calculates normalized amplitude by adjusting the normalized frequency to the frequency response characteristic curve of a filter.

Here, the filter may be a high-pass filter such as a (−1 2 −1)/4 filter. The (−1 2 −1)/4 filter is a digital filter that calculates a normalized amplitude by multiplying three bit streams having normalized frequencies by −1/4, 1/2, and −1/4, respectively, and adding the multiplication results together when the three bit streams are input to the filter. The indication value setter 515 properly performs an operation on the normalized amplitude and sets the result as the indication value.

In detail, the indication value setter 515 performs convolution on the frequency function of the normalized frequency and that of the filter, and sets the absolute value of the convolution result as the indication value.

The process of setting the indication value with the indication value setter 515 can be expressed with the following equations:

$$y(n)=f(n)*x(n) => abs(y(n))=0-128 \quad (1)$$

wherein x(n) denotes an input value, f(n) denotes the value of a filter, y(n) denotes an output value, X(w) denotes a value obtained by performing the Fourier transform on the input value, F(w) denotes a value obtained by performing the Fourier transform on the value of the filter, and Y(w) denotes a value obtained by performing the Fourier transform on the output value.

If the Fourier transform is performed on both sides of Equation 1, the following equations are obtained:

$$abs(Y(w))=abs(F(w))\times abs(X(w)) \quad (2)$$

$$phase(Y(w))=phase(F(w))+phase(X(w)) \quad (3)$$

If the filter is a (−1 2 −2)/4 filter, abs(F(w))=0−1 in Equation (1). If abs(X(w)) or abs(Y(w))=0−N in Equation (1), abs(X(w)) or abs(Y(w))=0−1 when the both sides of Equation 1 are normalized. Therefore, Equation (2) needs to be expanded without being normalized.

If abs(X(w)) is 0.28 or less, abs(Y(w)) is always 0.28 or less.

$$abs(X(w))=0.28\times abs(XX(w)) \quad (4)$$

$$abs(Y(w))=0.28\times abs(YY(w)) \quad (5)$$

If XX(w)=0−1 and YY(w)=0−1 in Equations (4) and (5), the inverse Fourier transform is performed to obtain the following equation:

$$y(n)=0.28\times yy(n)=f(n)*0.28\times xx(n) \quad (6)$$

In this case, abs(y(n))=0−0.28×128(37).

In the above equations, * is a convolution sign, × is a multiplication sign, and abs denotes an absolute value.

The level selector 52 divides the indication values of all of the pixels of the input image signal into several sections so that the indication values belong to sections labelled with different levels, respectively, and then selects the level of a section. The indication values are continuous values, and thus, it is efficient to dispersively express the indication values by dividing them into several sections, when determining a filtering frequency band that is applicable to all of pixels. Also, the smaller the difference between adjacent levels and the more the number of the levels, the more precisely the distribution of the frequencies of an input image can be estimated. The frequency characteristic determination unit 53 determines one of the levels of the pixels, which corresponds to most of the indication values, as the frequency characteristic. That is, the level of a pixel by which the frequency of the input image signal can be adjusted to the most proper filtering frequency band when filtering the input image signal, is determined as the frequency characteristic.

Figure 6:
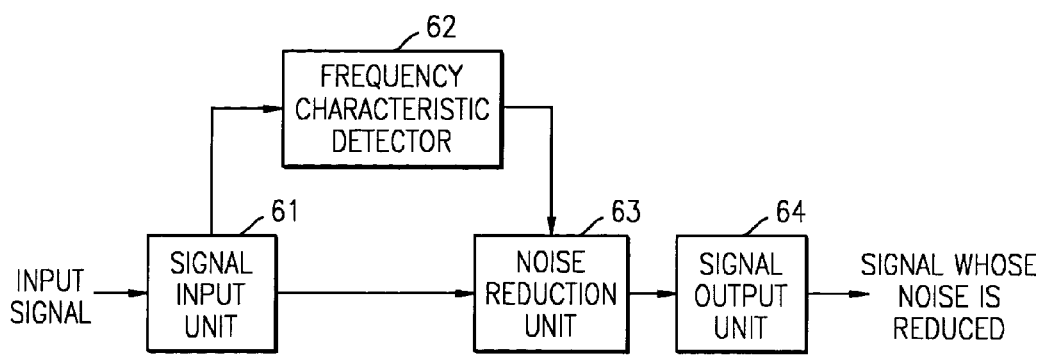
FIG. 6 is a block diagram of an apparatus for reducing noise in an input signal based on the frequency characteristic of the input signal, according to an exemplary embodiment of the present invention.

FIG. 6 is a block diagram of an apparatus for reducing noise in an input signal based on a frequency characteristic, according to an exemplary embodiment of the present invention. The apparatus includes a signal input unit 61, a frequency characteristic detector 62, a noise reduction unit 63, and a signal output unit 64.

The signal input unit 61 receives a signal generated by a signal generating apparatus such as a receiver. The frequency characteristic detector 62 detects the frequency characteristic of the signal. The noise reduction unit 63 reduces noise in the signal based on the frequency characteristic. The signal output unit 64 outputs the signal in which noise is reduced to an external apparatus such as a monitor terminal. Here, the signal may be an image signal or a voice signal but in general, it is an image signal.

More specifically, the frequency characteristic detector 62 selects the level of a section of sections of predetermined numbers with respect to an indication value which indicates the difference between a predetermined basic filtering frequency band and a desired filtering frequency band of the signal, and then determines the selected level as the frequency characteristic. Here, the sections denote different levels. In general, an apparatus for reducing noise in an input signal, for example, a filter, is used to filter a signal that is not scaled. If the input image signal is a scaled signal, the apparatus is not capable of appropriately filtering the signal when a filtering frequency band for the apparatus is set, and thus, the filtering frequency band must be changed. Accordingly, there is a need to obtain a level based on values which indicate the difference between the basic filtering frequency band and the desired filtering frequency band. The level can be determined by computing the difference between the basic filtering frequency band and the desired filtering frequency band. Here, the values indicating the difference are continuous values. Thus, it is efficient to dispersively express the indication values by dividing them into several sections when determining a filtering frequency band that is applicable to all pixels. The noise reduction unit 63 filters the signal by adjusting the filtering frequency band based on the frequency characteristic, i.e., the determined level. That is, the noise reduction unit 63 filters the signal by appropriately adjusting the filtering frequency band to be proportional to the scale ratio of the signal when the signal is a scaled signal.

Figure 7:
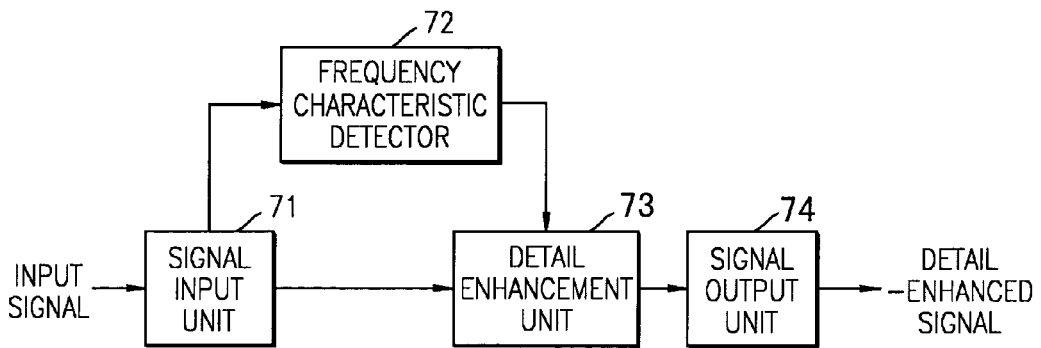
FIG. 7 is a block diagram of an apparatus for enhancing the details of an input signal based on the frequency characteristic of the input signal, according to an exemplary embodiment of the present invention.

FIG. 7 is a block diagram of an apparatus for enhancing details of an input signal based on a frequency characteristic, according to an exemplary embodiment of the present invention. The apparatus includes a signal input unit 71, a frequency characteristic detector 72, a detail enhancement unit 73, and a signal output unit 74.

The signal input unit 71 receives a signal generated by a signal generating apparatus such as a receiver. The frequency characteristic detector 72 detects the frequency characteristic of the signal. The detail enhancement unit 73 enhances the details of the signal based on the frequency characteristic. The signal output unit 74 outputs the detail-enhanced signal to an external apparatus such as a monitor terminal. Here, the signal may be an image signal or a voice signal but in general, it is an image signal.

In detail, the frequency characteristic detector 72 selects the level of a section from sections labelled with different levels with respect to each indication value which indicates the difference between a predetermined basic filtering frequency band and a desired filtering frequency band of the signal, and then sets the selected level as the frequency characteristic. In other words, if the input image signal is a scaled signal, an apparatus for reducing noise in an input signal, for example, a filter, is not capable of appropriately filtering the signal when a filtering frequency band is set to be proper to filter the original signal. Thus, the filtering frequency band must be changed. Accordingly, there is a need to obtain a level based on values which indicate the difference between the basic filtering frequency band and the desired filtering frequency band. The level can be determined by computing the difference between the basic filtering frequency band and the desired filtering frequency band. Here, the values indicating the difference are continuous values. Thus, it is efficient to dispersively express the indication values by dividing these values into several sections when determining a filtering frequency band that is applicable to all pixels. The detail enhancement unit 73 filters the signal by adjusting the filtering frequency band based on the frequency characteristic, amplifies the filtered signal, and overlaps the amplified signal with the input signal. That is, when the signal is a scaled signal, the detail enhancement unit 73 filters the signal by appropriately adjusting the filtering frequency band to be proportional to the scale ratio of the signal, amplifies the filtered signal, and overlaps the amplified signal with the input signal, thereby improving the quality of an image signal or a voice signal.

Figure 8:
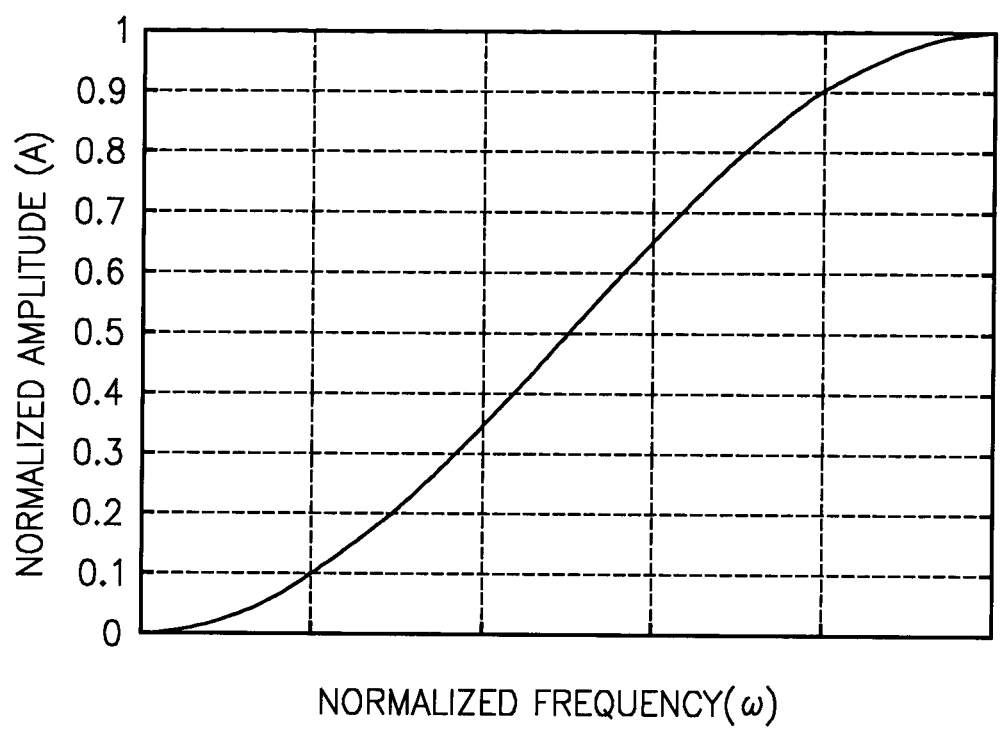
FIG. 8 illustrates a frequency response characteristic curve of a (−1 2 −1)/4 filter used in the present invention.

FIG. 8 is a graph illustrating the frequency response of a (−1 2 −1)/4 filter used in the present invention. The (−1 2 −1)/4 filter may be used in the normalized amplitude calculator 514 of FIG. 5. The (−1 2 −1)/4 filter is a digital filter that calculates a normalized amplitude by multiplying three bit streams of normalized frequencies by −1/4, 1/2, and −1/4, respectively, and adding the multiplication results together, when the three bit streams are input to the filter. For instance, the filter outputs a value 0 when a bit stream (0 0 0) or (1 1 1) is input to the filter and outputs a value −1/2 when a bit stream (1 0 1) is input to the filter.

FIG. 9 is a table illustrating indication values obtained when up-scaled input images are input to a (−1 2 −1/4) filter. In detail, FIG. 9 illustrates indication values output from the filter when input images of a range between 0 and 255 are up scaled and then pass through the filter. It is possible to calculate the maximum frequencies and the frequency characteristic of the input images using the indication values, i.e., the distribution of the levels of the indication values. For instance, if an input image of 720×480 is up scaled to 1280×720, the maximum frequency of a pixel is 4.3 Mhz, the Nyquist frequency is 6.75 Mhz, and the normalized maximum frequency is 0.36 Mhz. The frequency response characteristic curve of the filter reveals that the normalized maximum amplitude is 0.28. Let us assume that indication values under 8, indication values between 17 and 36, indication values between 36 and 70, and indication values above 71 belong to levels A, B, C, and D, respectively. If the number of indication values belonging to levels C and D is 0 and a plurality of indication values belong to level B, the normalized maximum frequency is 0.36 and most of the pixel data of the input image signal are present at a frequency band between 0.24 and 0.36.

Figure 10:
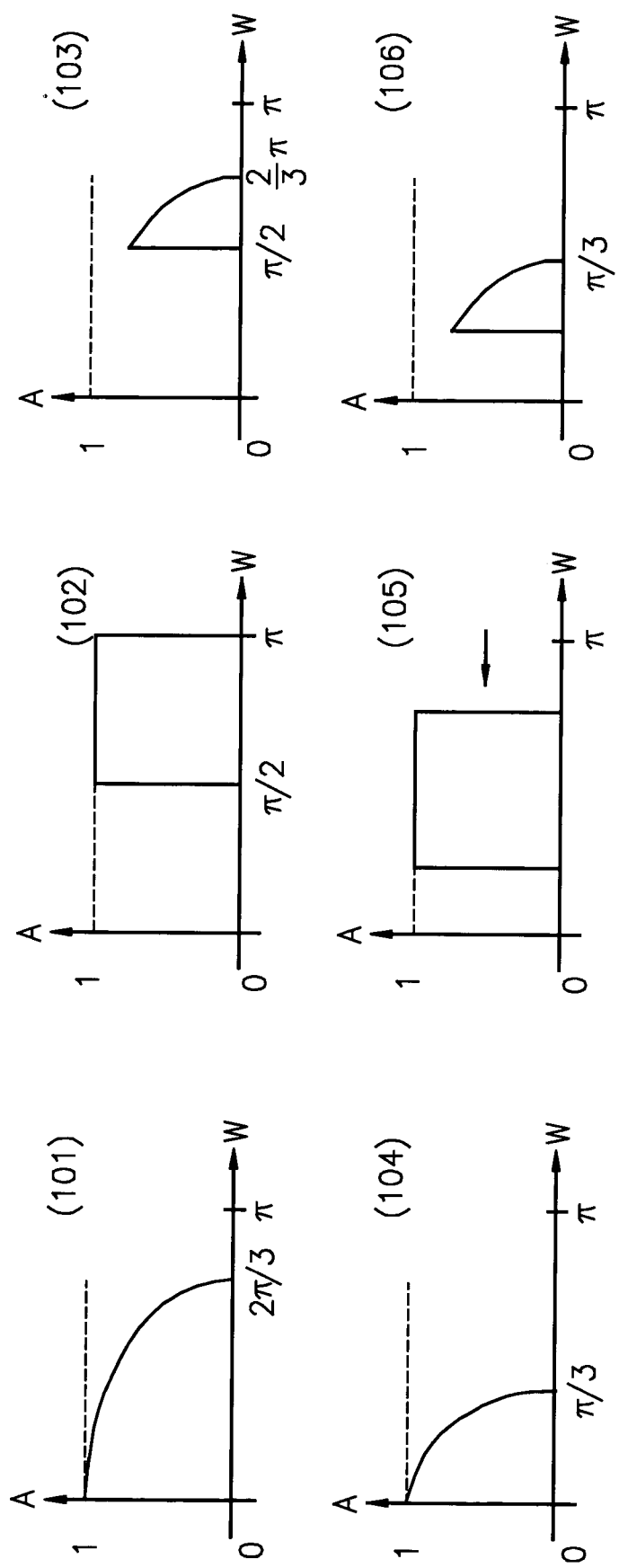
FIG. 10 illustrates waveform diagrams of image signals passing through a filter according to the present invention.

FIG. 10 illustrates waveform diagrams of image signals passing through a filter according to the present invention. Referring to FIG. 10, when an input image signal having a waveform 101 passes through a high-pass filter with a filtering frequency band 102, a signal having a waveform 103 is output from the filter. However, when an up-scaled image signal having a waveform 104 passes through the high-pass filter with the filtering frequency band 102, no image signal is output from the filter. In this case, it is impossible to reduce noise in the signal or enhance the details of the signal. However, a signal having a waveform 106 is output from the filter when the filtering frequency band 102 of the filter is changed to a filtering frequency band 105 based on the frequency characteristic of the input image signal.

Figure 11:
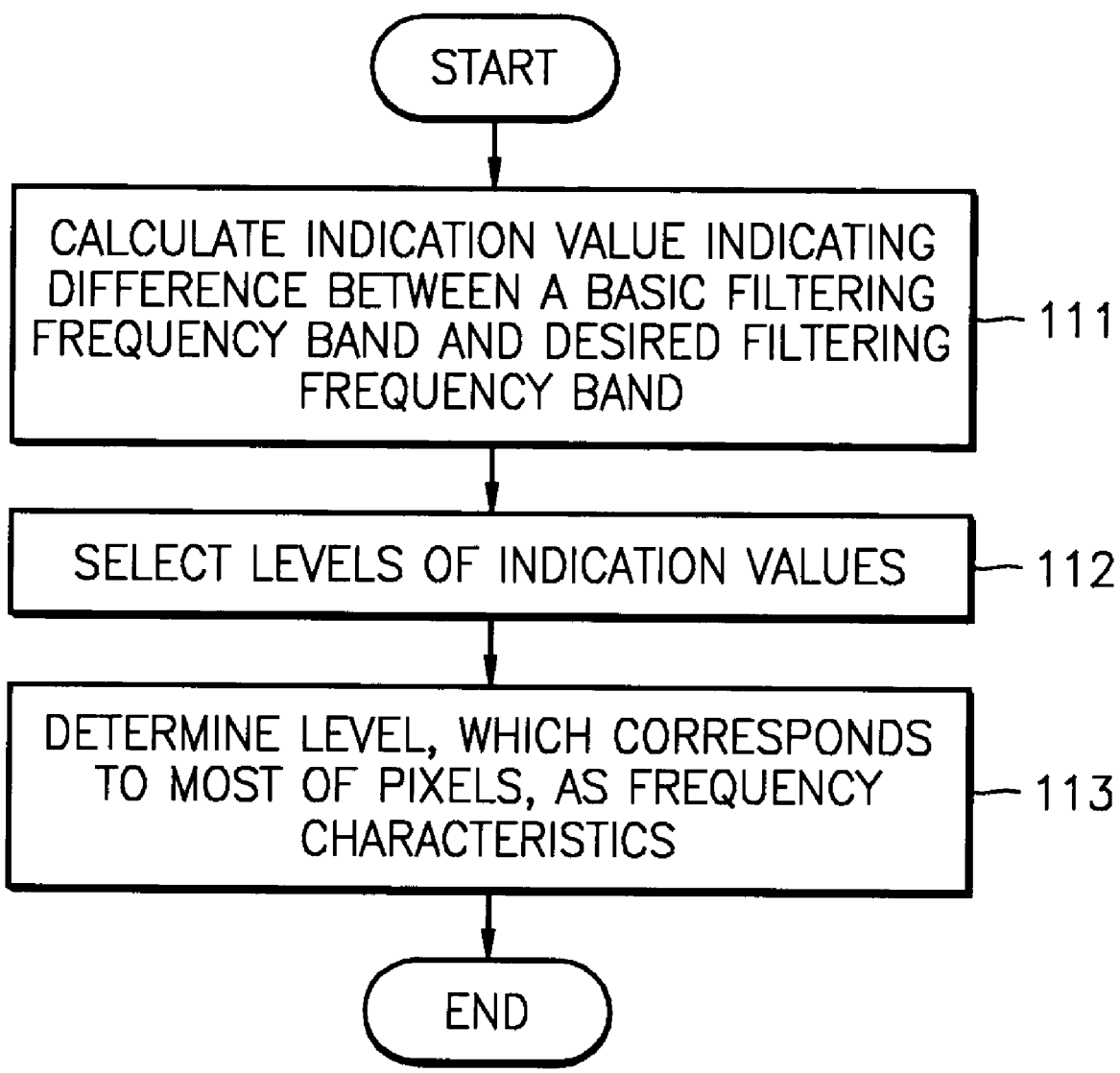
FIG. 11 is a flowchart illustrating a method of reducing noise in an input signal based on the frequency characteristic, according to an exemplary embodiment of the present invention.

FIG. 11 is a flowchart illustrating a method of detecting the frequency characteristic of an input signal. Referring to FIG. 11, an indication value, which indicates the difference between the basic filtering frequency band of a signal processor and a desired filtering frequency band of a signal, is calculated in action 111. Next, the level of one of the sections of a predetermined number is selected with respect to the indication value in action 112, the sections being labelled with different levels. Next, the selected level is set as the frequency characteristic in action 113. Here, the filtering frequency band is adjusted using the set level, and in general, the signal is an image signal.

Figure 12:
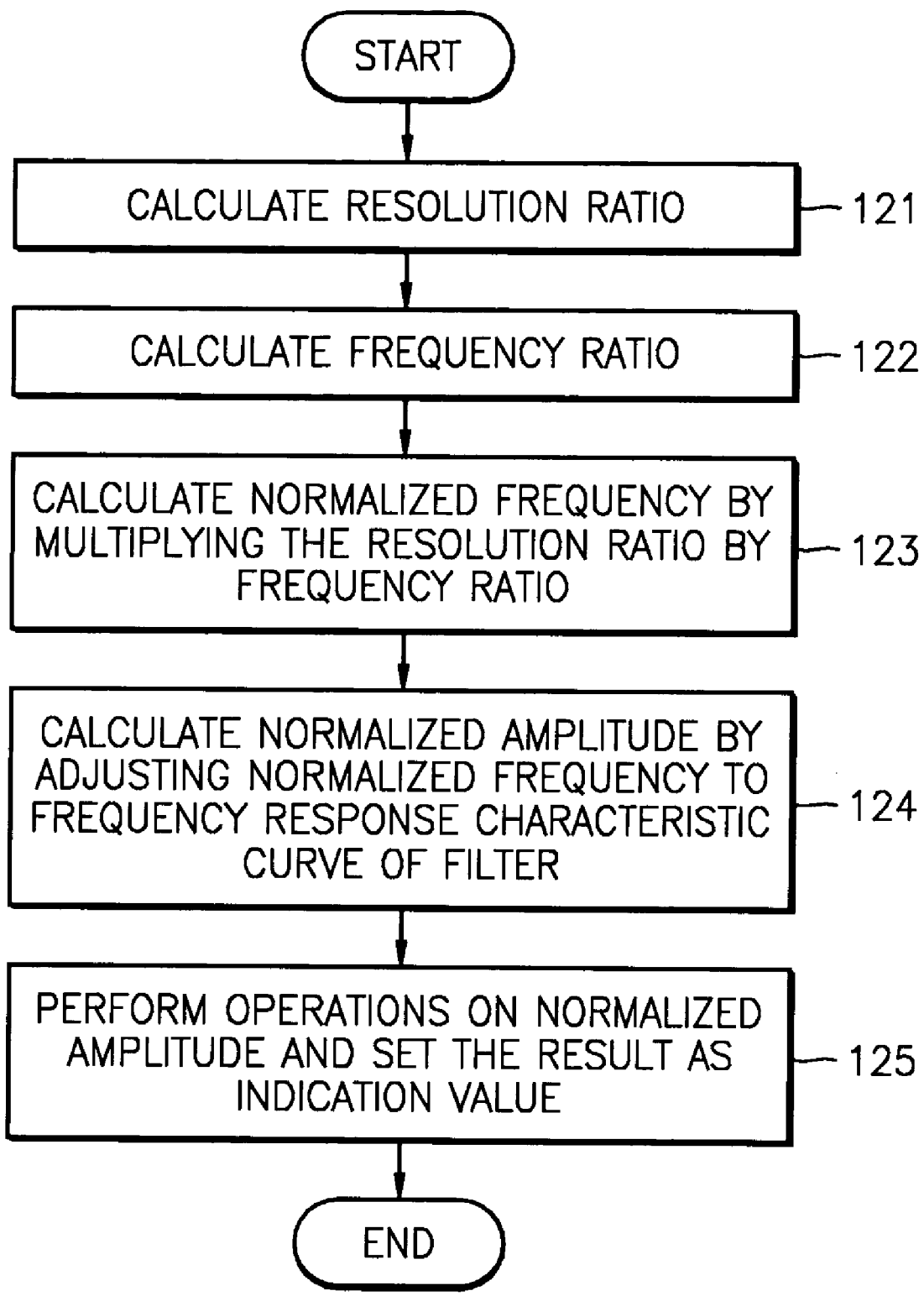
FIG. 12 is a flowchart illustrating a method of enhancing the details of an input signal based on the frequency characteristic, according to an exemplary embodiment of the present invention.

FIG. 12 is a flowchart illustrating a method of calculating an indication value, the method being included in a method of detecting the frequency characteristic of an input signal, according to an exemplary embodiment of the present invention. First, a ratio of the standard resolution of an image signal processor to the resolution of an image signal is calculated in action 121. The image signal processor may be an apparatus for reducing noise in an input image signal or an apparatus for enhancing the details of an input image signal. The standard resolution is the resolution of an image signal that can be filtered at a basic filtering frequency band of the image signal processor. The resolution of the input image signal corresponds to a resolution obtained by scaling the standard resolution to match the resolution of an image signal output device. After action 121, a ratio of the frequency of each pixel of the image signal to the Nyquist frequency is calculated in action 122. Next, a normalized frequency is calculated by multiplying the resolution ratio by the frequency ratio in action 123. Next, normalized amplitude is calculated by adjusting the normalized frequency to the frequency response characteristic curve of a certain filter in action 124. In the exemplary embodiment of the present invention, a high-pass filter is used as the filter. After action 124, an operation is performed on the value of the normalized amplitude and the result is set as the indication value in action 125. In detail, convolution is performed on the frequency functions of the normalized amplitudes and the frequency function of the filter with respect to the pixels of the input image signal, and the absolute value of the convolution values is set as the indication value. After action 125, the indication values of all of the pixels are categorized into several sections so that they belong to sections labelled with levels, and then, one of sections labelled with different levels is selected with respect to the indication value of each pixel, in action 112. After action 112, one of the levels, which correspond to most of the pixels, is determined as the frequency characteristic in action 113.

Figure 13:
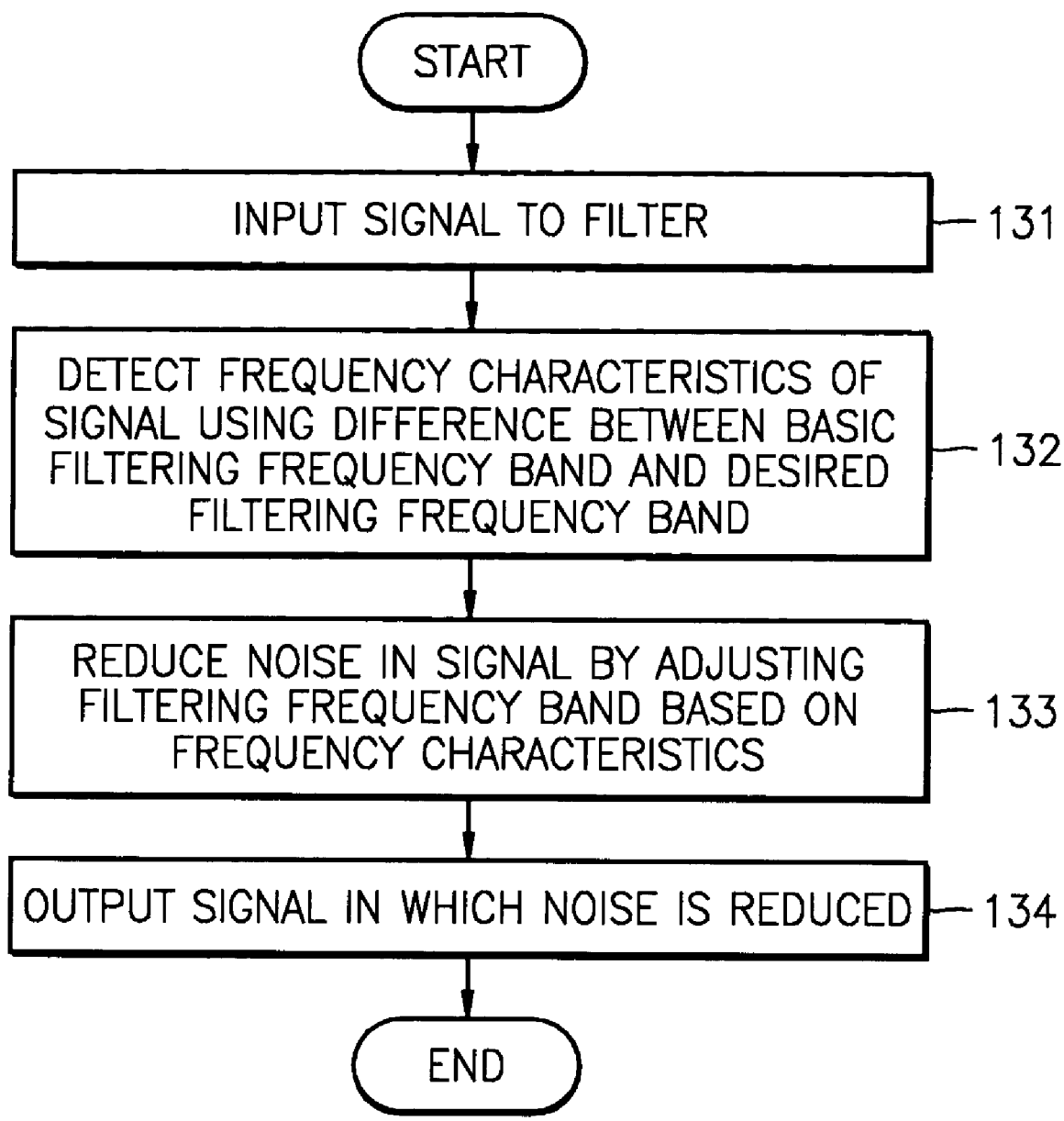
FIG. 13 is a flowchart illustrating a method of detecting the frequency characteristic of an input signal.

FIG. 13 is a flowchart illustrating a method of reducing noise in an input image signal based on a frequency characteristic, according to an exemplary embodiment of the present invention. First, a signal is input to a filter in action 131. Next, the frequency characteristic of the signal is detected in action 132. More specifically, the level of one of the sections of a predetermined number is selected with respect to each of the indication values which indicate the difference between a predetermined basic filtering frequency band and a desired filtering frequency band of the signal, and the selected level is determined as the frequency characteristic. Here, the sections are labelled with different levels. After action 132, noise in the signal is reduced based on the frequency characteristic in action 133, i.e., the filtering frequency band is adjusted based on the frequency characteristic so as to filter the signal. Next, the signal in which noise is reduced is output from the filter in action 134. Here, the signal may be an image signal or a voice signal, but in general, the signal is an image signal.

Figure 14:
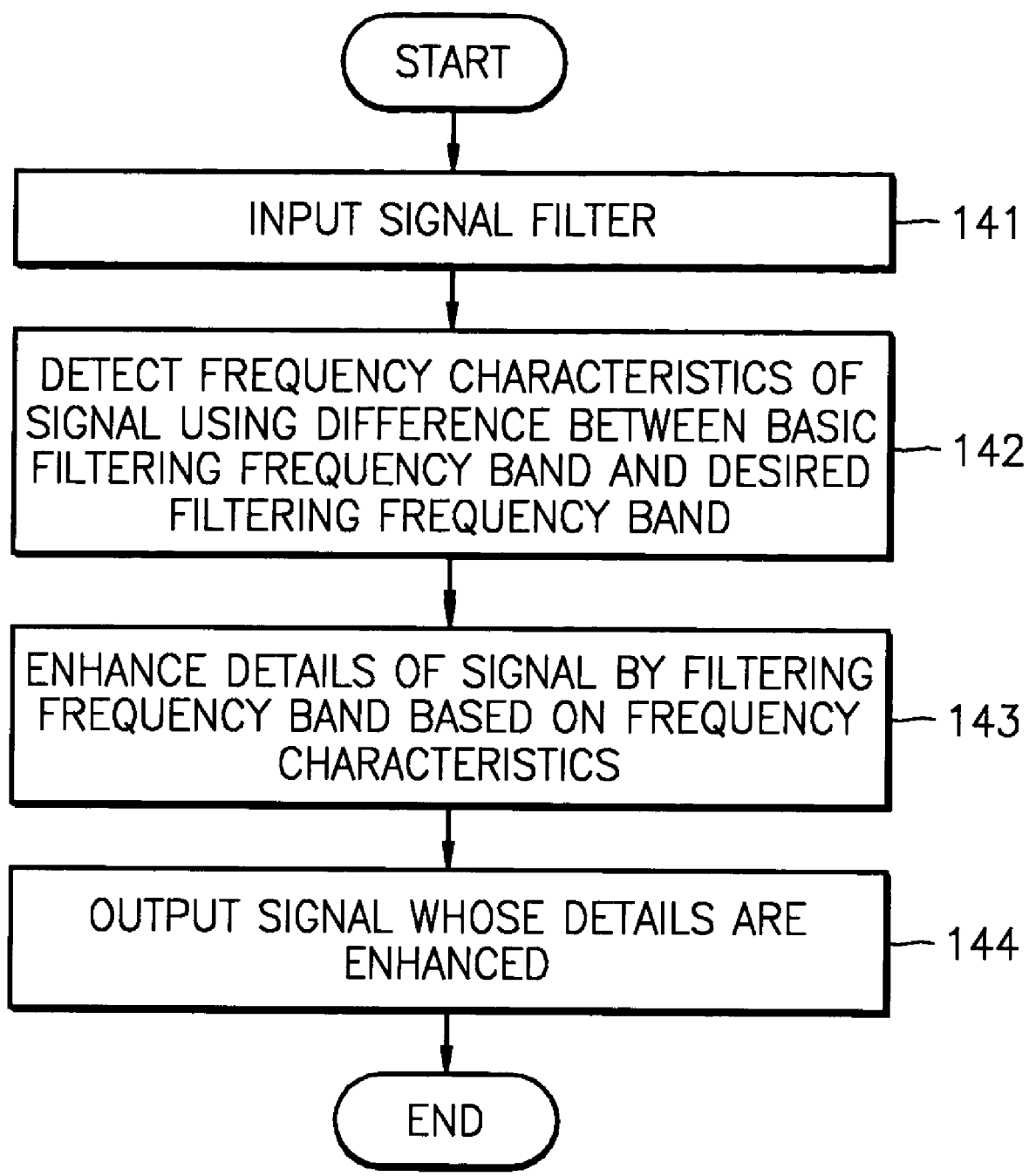
FIG. 14 is a flowchart illustrating a method of calculating indication value, the method being included in a method of detecting the frequency characteristic of an input signal, according to an exemplary embodiment of the present invention.

FIG. 14 is a flowchart illustrating a method of enhancing the details of an input image signal based on a frequency characteristic, according to an exemplary embodiment of the present invention. First, a signal is input to a filter in action 141. Next, the frequency characteristic of the signal is detected in action 142. That is, the level of one of the sections of a predetermined number is selected with respect to each of the indication values which indicate the difference between a predetermined basic filtering frequency band and a desired filtering frequency band of the signal, and the selected level is determined as the frequency characteristic. Here, the sections are labelled with different levels. After action 142, the details of the input signal are improved based on the frequency characteristic in action 143. In detail, the signal is filtered by adjusting the filtering frequency band based on the frequency characteristic, the filtered signal is amplified, and the amplified signal is overlapped over the input image signal. After action 143, the detailenhanced signal is output from the filter in action 144. Here, the signal may be an image signal or a voice signal, but in general, the signal is an image signal.

The present invention can be embodied as a computer readable program that can be run by a computer, and implemented in a digital computer using a computer readable recording medium. Here, the computer readable medium may be any recording apparatus including a magnetic storage medium, such as read-only memory (ROM), a floppy disk, and a hard disc, and an optical recording medium, such as CD ROM, and DVD). Also, the computer readable medium may be a carrier wave that transmits data via the Internet, for example.

While this invention has been particularly shown and described with reference to exemplary embodiments thereof, it will be understood by those skilled in the art that various changes in form and details may be made therein without departing from the spirit and scope of the invention as defined by the appended claims.

As described above, according to the present invention, the distribution of frequencies of an input signal is analysed, a filtering frequency band is adjusted based on the analysed frequency characteristic, and the input signal is filtered at the adjusted filtering frequency band. Therefore, it is possible to appropriately filter an input signal regardless of the resolution of the signal. In particular, when the input signal is an image signal and the signal is scaled to different scale ratios, signals of different scale ratios can be filtered by using only one filter. For this reason, the present invention is very useful in a situation where different types of image output apparatuses, such as a standard-definition (SD) TV and a high-definition (HD) TV, are used together. That is, it is easily to reduce noise in signals of different scale ratios or enhance the details thereof by filtering the signals using a filter.

What is claimed is:

1. An apparatus for detecting a frequency characteristic of a signal, the apparatus comprising:
    an indication value calculator which calculates an indication value which indicates a difference between a filtering frequency band of an image signal processor and a desired filtering frequency band of the signal;
    a level selector which selects a one level of a section from a plurality of sections labeled with different levels with respect to the indication value; and
    a frequency characteristic determination unit which determines the selected level as the frequency characteristic.

2. The apparatus of claim 1, wherein the one level is used to adjust a filtering frequency band.

3. The apparatus of claim 1, wherein the signal is an image signal.

4. The apparatus of claim 3, wherein the indication value calculator comprises:
    a resolution ratio calculator which calculates a ratio of a standard resolution of the image signal processor to a resolution of the image signal;
    a frequency ratio calculator which calculates a ratio of a frequency in each pixel of the image signal to a Nyquist frequency;
    a normalized frequency calculator which calculates a normalized frequency by multiplying the calculated ratio of the standard resolution of the image signal processor to the resolution of the image signal by the calculated frequency ratio;
    a normalized amplitude calculator which calculates a normalized amplitude by adjusting the normalized frequency to a frequency response characteristic curve of a filter; and
    an indication value setter which performs an operation on the normalized amplitude and sets a result as the indication value.

5. The apparatus of claim 4, wherein the image signal processor is an apparatus for reducing noise in the input image signal.

6. The apparatus of claim 4, wherein the image signal processor is an apparatus for enhancing details of the input image signal.

7. The apparatus of claim 4, wherein the standard resolution is a resolution of a standard resolution image signal filtered at a basic filtering frequency band of the image signal processor.

8. The apparatus of claim 4, wherein the resolution of the image signal is obtained by scaling the standard resolution to match a resolution of an image signal output apparatus.

9. The apparatus of claim 4, wherein the filter is a high-pass filter.

10. The apparatus of claim 4, wherein the indication value setter performs convolution on a frequency function of the normalized amplitude of each pixel and a frequency function of the filter and sets an absolute value of a convolution result as the indication value.

11. The apparatus of claim 10, wherein the level selector divides the indication values of all of the pixels into several sections so that the indication values belong to the plurality of sections labeled with different levels, respectively, and selects the one level of the section with respect to the indication value of each pixel.

12. The apparatus of claim 11, wherein the frequency characteristic determination unit determines the one level of the section that corresponds to most of the pixels.

13. A method of detecting a frequency characteristic of an input signal, comprising:
    calculating an indication value which indicates a difference between a predetermined basic filtering frequency band and a desired filtering frequency band of the input signal;
    selecting a one level of a section from a plurality of sections labeled with different levels with respect to the indication value; and
    determining the selected level as the frequency characteristic.

14. The method of claim 13, wherein the one level is used to adjust a filtering frequency band.

15. The method of claim 13, wherein the input signal is an image signal.

16. The method of claim 15, wherein calculating the indication value comprises:
calculating a ratio of a standard resolution of an image signal processor to a resolution of the image signal;
calculating a ratio of a frequency of each pixel of the image signal to a Nyquist frequency;
calculating a normalized frequency by multiplying the calculated ratio of the standard resolution of the image signal processor to the resolution of the image signal by the calculated frequency ratio;
calculating a normalized amplitude by adjusting the normalized frequency to a frequency response characteristic curve of a filter; and
performing an operation on the normalized amplitude and setting a result as the indication value.

17. The method of claim 16, wherein the image signal processor is an apparatus for reducing noise in the input image signal.

18. The method of claim 16, wherein the image signal processor is an apparatus for enhancing details of the input image signal.

19. The method of claim 16, wherein the standard resolution is a resolution of a standard resolution image signal filtered at a basic filtering frequency band of the image signal processor.

20. The method of claim 16, wherein the resolution of the image signal is obtained by scaling the standard resolution to match an image signal output apparatus.

21. The method of claim 16, wherein the filter is a high-pass filter.

22. The method of claim 16, wherein during the setting of the indication value, convolution is performed on a frequency function of the normalized amplitude of each pixel and a frequency function of the filter and an absolute value of convolution results is set as the indication value.

23. The method of claim 22, wherein during the selection of the one level of the section, the indication values of all of the pixels are divided into several sections so that the indication values belong to the plurality of sections labeled with different levels, respectively, and the one level of the section selected from the plurality of sections is selected with respect to the indication value of each pixel.

24. The method of claim 23, wherein during the determination of the selected level as the frequency characteristic, the one level of the section which corresponds to most of the pixels is determined as the frequency characteristic.

25. A computer readable recording medium for recording a computer program code for enabling a computer to provide a service of detecting a frequency characteristic of an input signal, the service comprising the steps of:
calculating an indication value which indicates a difference between a predetermined basic filtering frequency band and a desired filtering frequency band of the input signal;
selecting a one level of a section from a plurality of sections labeled with different levels with respect to the indication value; and
determining the selected level as the frequency characteristic.

26. The computer-readable recording medium of claim 25, wherein the one level is used to adjust a filtering frequency band.

27. The computer-readable recording medium of claim 25, wherein the input signal is an image signal.

28. The computer-readable recording medium of claim 27, wherein calculating the indication value comprises:
calculating a ratio of a standard resolution of an image signal processor to a resolution of the image signal;
calculating a ratio of a frequency of each pixel of the image signal to a Nyquist frequency;
calculating a normalized frequency by multiplying the calculated ratio of the standard resolution of the image signal processor to the resolution of the image signal by the calculated frequency ratio;
calculating a normalized amplitude by adjusting the normalized frequency to a frequency response characteristic curve of a filter; and
performing an operation on the normalized amplitude and setting a result as the indication value.

29. The computer-readable recording medium of claim 28, wherein the image signal processor is an apparatus for reducing noise in the input image signal.

30. The computer-readable recording medium of claim 28, wherein the image signal processor is an apparatus for enhancing details of the input image signal.

31. The computer-readable recording medium of claim 28, wherein the standard resolution is a resolution of a standard resolution image filtered at a basic filtering frequency band of the image signal processor.

32. The computer-readable recording medium of claim 28, wherein the resolution of the image signal is obtained by scaling the standard resolution to match an image signal output apparatus.

33. The computer-readable recording medium of claim 28, wherein the filter is a high-pass filter.

34. The computer-readable recording medium of claim 28, wherein during the setting of the indication value, convolution is performed on a frequency function of the normalized amplitude of each pixel and a frequency function of the filter and an absolute value of a convolution result is set as the indication value.

35. The computer-readable recording medium of claim 34, wherein during the selection of the one level of the section, the indication values of all of the pixels are divided into several sections so that the indication values belong to the plurality of sections labeled with different levels, respectively, and the one level of the section selected from the plurality of sections is selected with respect to the indication value of each pixel.

36. The computer-readable recording medium of claim 35, wherein during the determination of the selected level as the frequency characteristic, the one level of the section which corresponds to most of the pixels is determined as the frequency characteristic.

* * * * *